(12) United States Patent
Liberty et al.

(10) Patent No.: US 8,704,766 B1
(45) Date of Patent: Apr. 22, 2014

(54) APPARATUSSES AND METHODS TO SUPRESS UNINTENDED MOTION OF A POINTING DEVICE

(75) Inventors: Matthew G. Liberty, Gaithersburg, MD (US); Bryan A. Cook, Silver Spring, MD (US); Pouyan Amirshahi, North Potomac, MD (US)

(73) Assignee: Hillcrest Laboratories, Inc., Rockville, MD (US)

( * ) Notice: Subject to any disclaimer, the term of this patent is extended or adjusted under 35 U.S.C. 154(b) by 213 days.

(21) Appl. No.: 13/284,357

(22) Filed: Oct. 28, 2011

Related U.S. Application Data (60) Provisional application No. 61/408,168, filed on Oct. 29, 2010.

(51) Int. Cl.
*G06F 3/033* (2013.01)

(52) U.S. Cl.
USPC .......................................... 345/157; 345/158

(58) Field of Classification Search
None
See application file for complete search history.

(56) References Cited

U.S. PATENT DOCUMENTS

| 7,158,118 | B2 | 1/2007 | Liberty |
| 7,535,456 | B2 | 5/2009 | Liberty et al. |
| 7,860,676 | B2 | 12/2010 | Sheng et al. |
| 2006/0262116 | A1 | 11/2006 | Moshiri et al. |
| 2007/0035518 | A1 | 2/2007 | Francz et al. |
| 2010/0214215 | A1* | 8/2010 | Benenson ............... 345/158 |

* cited by examiner

*Primary Examiner* — Joseph Haley
(74) *Attorney, Agent, or Firm* — Patent Portfolio Builders PLLC (57) ABSTRACT

Methods for processing information transmitted from a pointing device with at least one button towards a graphical interface operating according to received display motion coordinates and notifications are provided. A method includes intercepting sensed motion coordinates and the button status transmitted from the pointing device. The method further includes determining the display motion coordinates and the notifications based on an evolution of the sensed coordinates and an evolution of the button status, to remove an unintentional motion included in the sensed motion coordinates. The method then includes outputting the display motion coordinates and the notifications towards the graphical interface.

14 Claims, 7 Drawing Sheets

APPARATUSSES AND METHODS TO SUPRESS UNINTENDED MOTION OF A POINTING DEVICE

TECHNICAL FIELD

The present inventions are related to techniques, devices, systems and software for unintended motion suppression from motion output of pointing devices.

BACKGROUND

Technologies associated with the communication of information have evolved rapidly over the last several decades. Television, cellular telephony, the Internet and optical communication techniques (to name just a few things) combine to inundate consumers with available information and entertainment options. The technological ability to provide interface devices easy to manipulate and responding prompt and accurate not only to user's actual manipulation but also to user's actual intent.

The widest spread interface device used to convey a user's desires to a screen is the mouse. A mouse's motion on a 2-D surface yields a cursor motion on a screen.

Figure 1:
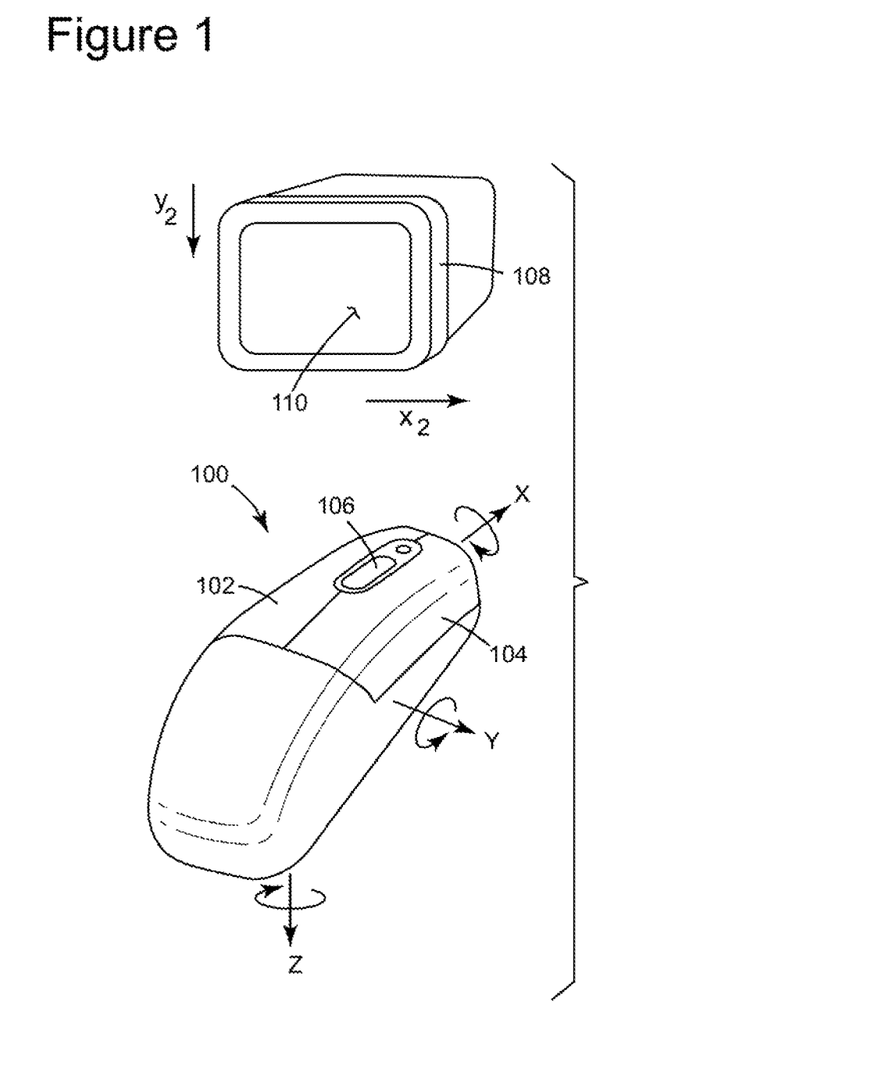
FIG. 1 is an illustration of operation of a pointing device.

Recently, 3-D operating handheld devices provide more and more competitive alternative to the mouse. An exemplary 3D pointing device 100 (that has an appearance similar to the conventional mouse) is depicted in FIG. 1. Therein, a user operates the 3D pointing device 100, for example, altering a combination of x-axis attitude (roll), y-axis elevation (pitch) and/or z-axis heading (yaw) position of the 3D pointing device 100. The effect is a change in position of the cursor 110 on a screen 108. In some exemplary embodiments, the cursor is moved due to linear movement of the 3D pointing device 100 along the x, y, and z axes to generate cursor movement or other user interface commands. The 3D pointing device 100 includes two buttons 102 and 104, as well as a scroll wheel 106, although this configuration is exemplary no intended to be limiting. The motion of the 3D pointing device 100 sensed and translated into output usable to interact with the information displayed on display 108. For example, rotation of the 3D pointing device 100 about the y-axis can be sensed by the 3D pointing device 100 and translated into an output usable by the system to move cursor 110 along the $y_2$ axis of the display 108. Likewise, rotation of the 3D pointing device 108 about the z-axis can be sensed by the 3D pointing device 100 and translated into an output usable by the system to move cursor 110 along the $x_2$ axis of the display 108. It will be appreciated that the output of 3D pointing device 100 can be used to interact with the display 108 in a number of ways other than (or in addition to) cursor movement.

Figure 2:
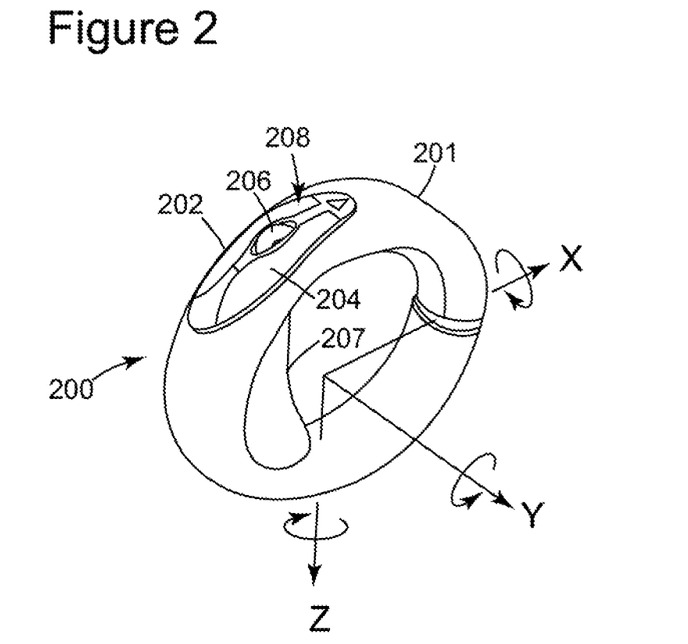
FIG. 2 is an illustration of another pointing device.

Another example of a 3-D pointing device is illustrated in FIG. 2. The 3D pointing device 200 in FIG. 2 includes a ring-shaped housing 201, two buttons 202 and 204 as well as a scroll wheel 206 and a grip 207. The two buttons 202 and 204 and the scroll wheel 206 are located in a "control area" 208, which is disposed on an outer portion of the ring-shaped housing 201. More details regarding this exemplary embodiment can be found in U.S. patent application Ser. No. 11/480,662, entitled "3D Pointing Devices", filed on Jul. 3, 2006, the disclosure of which is incorporated here by reference.

Figure 3:
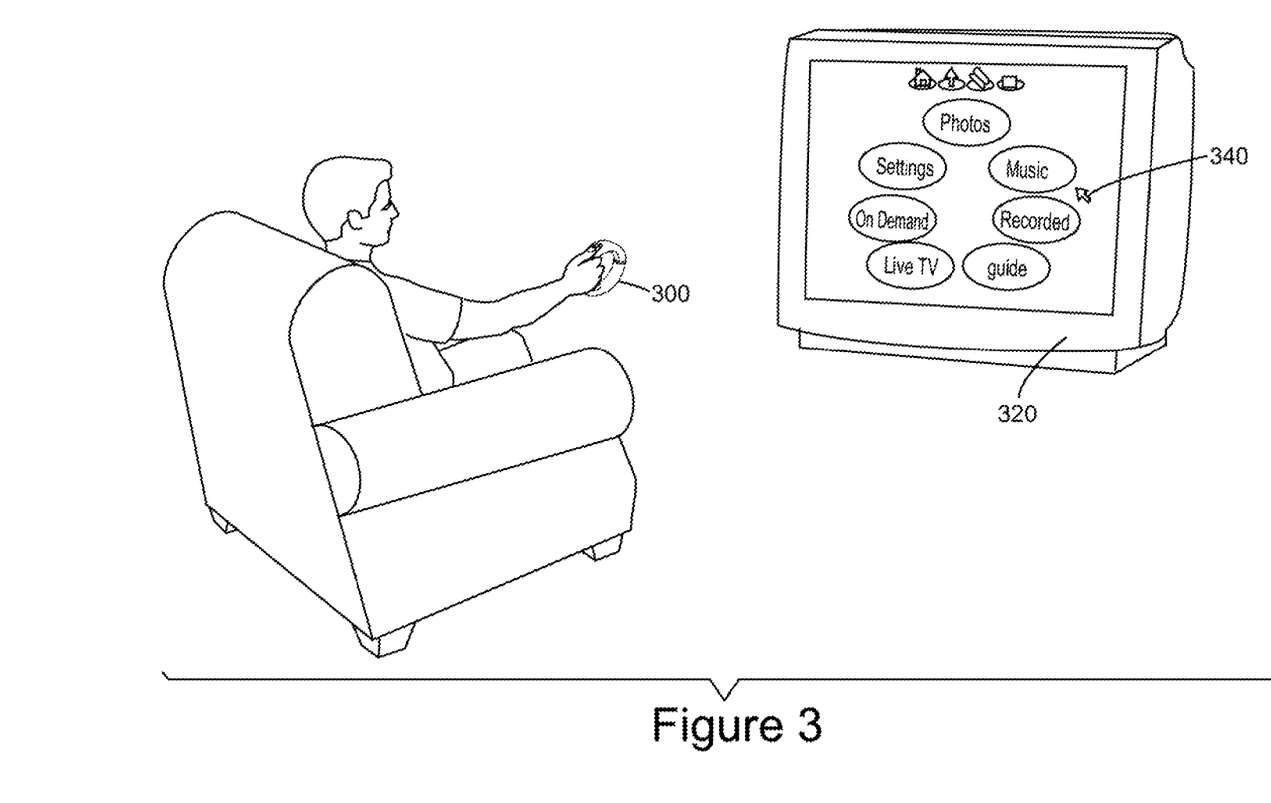
FIG. 3 illustrates usage of a pointing device.

The pointing devices typically include at least one button that, when pressed, trigger actions related to items displayed on the screen at or around the cursor's position. Such devices have numerous applications including, for example, usage in the so-called "10 foot" interface between a sofa and a television in the typical living room as shown in FIG. 3. Therein, as the pointing device 300 moves between different positions, that movement is detected by one or more sensors attached to the pointing device 300, and transmitted to the television 320 (or associated system component, e.g., a set-top box (not shown)). The movement of the 3D pointing device 300 can, for example, be translated into movement of a cursor 340 displayed on the television 320 and which is used to interact with a user interface. Details of an exemplary user interface with which the user can interact via a pointing device can be found, for example, in the U.S. patent application Ser. No. 11/437,215, entitled "Global Navigation Objects in User Interfaces", filed on May 19, 2006, the disclosure of which is incorporated here by reference.

In order to enable various interface operations, the pointing devices include at least one button. This button may be used for selecting a displayed item or initiating other operations (e.g., causing display of a submenu associated with the item) by pressing and/or releasing the button. Plural button-release sequences within a short time interval may initiate different operations. For example, a single click-release of the button may cause displaying information about an application associated with the item, while a double click-release may cause the application to start running. The pointing devices are also frequently used to change position on the screen of the item by keeping the button pressed while changing the position of the cursor.

One problem associated with the dual aspect operation of the pointing device, i.e., change of coordinates and button operation, is that unintended motion (such as, tremor or other unintentional motions occurring when a user executes a button pressing action) may result in un-intended consequences, or inability to achieve the intended operation. The unintentional motions are more pronounced when 3-D pointing devices are used than for the 2-D pointing devices (e.g., the conventional mouse) due to the absence of the support surface.

Accordingly, it would be desirable to provide devices, systems and methods that would stabilize the cursor output when the button is pressed or to allow for a plural click-release at the same location, and achieve a better distinction between a select action and a drag action of the user.

SUMMARY

It is an object to overcome some of the deficiencies discussed in the previous section and to provide a user of a pointing device with an enhanced experience when being able to perform both drag and multiple-click (press-release sequence) selection.

According to one exemplary embodiment, an apparatus located between (A) a pointing device having a button and outputting sensed motion coordinates and a button status, and (B) a graphical interface operating according to received display motion coordinates and notifications related to the button status is provided. The apparatus includes an input/output (I/O) interface connected to the pointing device and to the graphical interface, and configured to receive the sensed motion coordinates and the button status from the pointing device, and to output the display motion coordinates and the notifications towards the graphical interface. The apparatus also includes a processing unit connected to the I/O interface and configured to determine the display motion coordinates and the notifications based on an evolution of the sensed motion coordinates and an evolution of the button status, such as to remove an unintentional motion included in the sensed motion coordinates from an evolution of the display motion coordinates.

According to another exemplary embodiment, a method for processing information transmitted from a pointing device with at least one button towards a graphical interface operating according to received display motion coordinates and notifications is provided. The method includes intercepting sensed motion coordinates and the button status transmitted from the pointing device. The method further includes determining the display motion coordinates and the notifications based on an evolution of the sensed coordinates and an evolution of the button status, to remove an unintentional motion included in the sensed motion coordinates. The method then includes outputting the display motion coordinates and the notifications towards the graphical interface.

According to another exemplary embodiment, a computer readable storing medium storing executable codes which when executed by a computer located on a data transmission path between a pointing device with at least one button and a graphical interface operating according to received display motion coordinates and a button status make the computer execute a method is provided. The method includes intercepting sensed motion coordinates and the button status transmitted from the pointing device. The method further includes determining the display motion coordinates and the notifications based on an evolution of the sensed coordinates and an evolution of the button status, to remove an unintentional motion included in the sensed motion coordinates. The method then includes outputting the display motion coordinates and the notifications towards the graphical interface.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of an interface between a pointing device with one button to a screen on which are displayed a plurality of items and a cursor. However, the embodiments to be discussed next are not limited to these systems, but may be applied to other existing systems that have motion-based operation concurrent with other types of action-based operation.

Reference throughout the specification to "one embodiment" or "an embodiment" means that a particular feature, structure, or characteristic described in connection with an embodiment is included in at least one embodiment of the present invention. Thus, the appearance of the phrases "in one embodiment" or "in an embodiment" in various places throughout the specification is not necessarily all referring to the same embodiment. Further, the particular features, structures or characteristics may be combined in any suitable manner in one or more embodiments.

Figure 4:
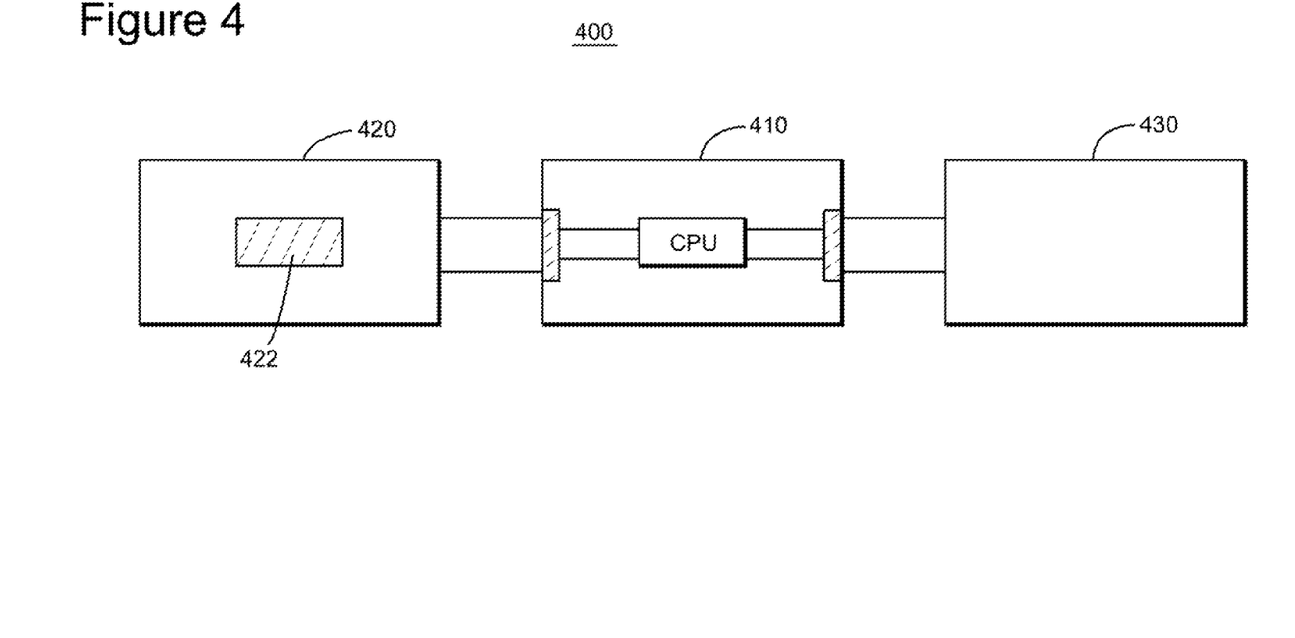
FIG. 4 is a schematic diagram of a system including an apparatus according to an exemplary embodiment.

In order to perform suppression of an unintentional motion, as illustrated in FIG. 4, in a system 400, an apparatus 410 is located along a data transmission path, between a pointing device 420 and a graphical interface 430. Here graphical interface means hardware and software that operate to display, on a screen, plural items (e.g., icons) and a cursor, whose motion corresponds to the pointing device motion. The pointing device 420 has at least one button 422 and is configured to output sensed motion coordinates and a button status. The graphical interface 430 operates according to received display motion coordinates and the button status.

In fact the apparatus 410 may be physically collocated with either the pointing device 420 or the graphical interface 430. The pointing device 420 may include plural buttons whose status may be changed due to the user's actions. The pointing device 420 may transmit button statuses at predetermined time intervals or may signal when changes of respective statuses occur. The pointing device 420 may output the sensed motion coordinates at predetermined time intervals.

Figure 5:
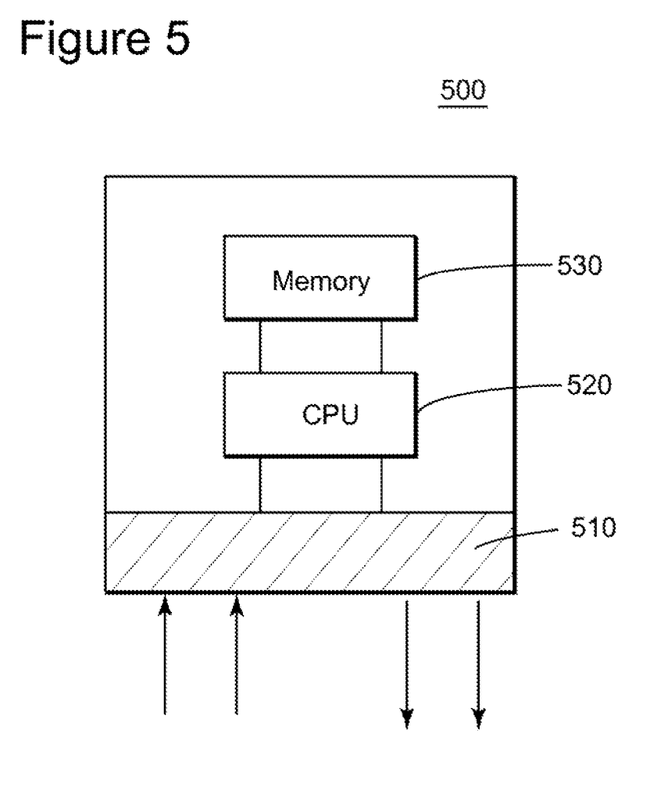
FIG. 5 is a schematic diagram illustrating structure of an apparatus according to an embodiment.

FIG. 5 is a schematic diagram illustrating the structure of an apparatus 500 according to an embodiment. The apparatus 500 includes an input/output (I/O) interface 510 connected to the pointing device (e.g., 420) and to the graphical interface (e.g., 430). The I/O interface 510 is configured (1) to receive the sensed motion coordinates and the button status from the pointing device and (2) to output the display motion coordinates and the button status towards the graphical interface.

The apparatus further includes a processing unit 520 including hardware components such as a processor. The processing unit 520 is connected to the I/O interface 510 and it is configured to determine the display motion coordinates based on an evolution of the sensed motion coordinates, depending on an evolution of the button status, such as to remove an unintentional motion from an evolution of the display motion coordinates. Here, the evolution of the sensed motion coordinates means a time sequence of received values thereof. Similarly, the evolution of the button status means a time sequence of the received values of the button status.

Figure 6:
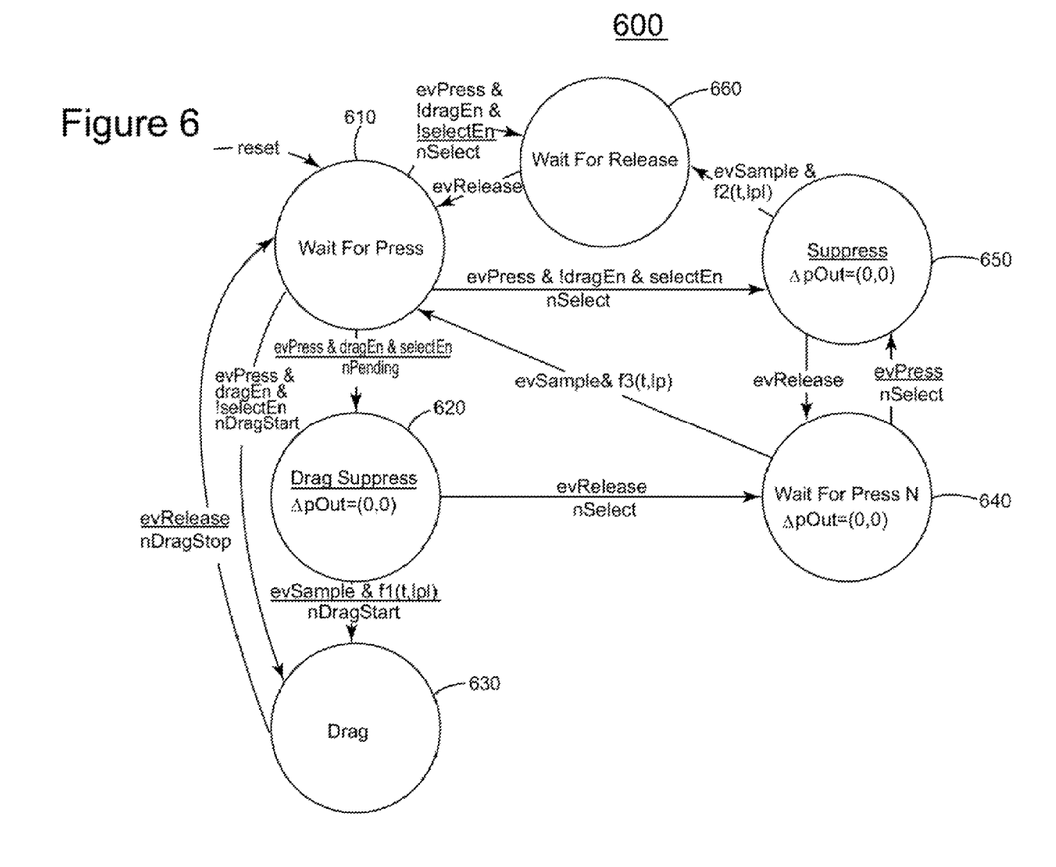
FIG. 6 is a state diagram illustrating a manner of operation of an apparatus according to an embodiment.

The state diagram 600 in FIG. 6 illustrates a manner of operation of an apparatus (e.g., 410, and/or 500) according to an exemplary embodiment. The state diagram 600 describes six states and transitions there-between. State "Wait For Press" 610 corresponds to a situation in which the button has not been pressed.

State "Drag Suppress" 620 corresponds to a situation in which the button has been pressed for a first time (i.e., not associated with another recent press-release sequence) and not yet released or dragged a significant distance (i.e., a difference between the previous sensed motion coordinates and the received sensed motion coordinates has exceeded a first predetermined distance). While the apparatus is in this state, the display motion coordinates maintain a constant value (i.e., the values of the display motion coordinates when the transition in the state has occurred) for a first predetermined time interval or until a change in the sensed motion coordinates exceeds the first predetermined distance. For example, the first predetermined time interval may be 0.4 s, and the first predetermined distance may be 35 pixels.

State "Drag" 630 corresponds to a situation when the button is pressed and not released, and a change in the received sensed coordinates has indicated a clear intent to perform a drag action (i.e., the difference between the previous sensed motion coordinates and the received sensed motion coordinates has exceeded the first predetermined distance or the first time interval has expired).

State "Wait For PressN" 640 corresponds to a situation when the button has been released and may be pressed again. While the apparatus is in this state, the display motion coordinates maintain a constant value for a second predetermined time interval or until a change in the sensed motion coordinates exceeds a second predetermined distance. For example, the second predetermined time interval may be 0.152 s and the second predetermined distance may be 8 pixels.

State "Suppress" 650 corresponds to a situation when the button has again been pressed a short time after a press-release sequence (i.e., the button being pressed is associated with the previous press-release sequence). While the apparatus is in this state, the display motion coordinates maintain a constant value for a third predetermined time interval or until a change in the sensed motion coordinates exceeds a third predetermined distance. For example the third time interval may be 0.32 s and the third predetermined distance may be 45 pixels.

State "Wait For Release" 660 corresponds to a situation when the button is still pressed but cursor motion is no longer suppressed because either enough time has elapsed or the device was moved too far to remain in state "Suppress" 650.

Thus, suppression of cursor motion occurs in states 620, 640 and 650. When a new sample of the device motion is available, an "evSample" event is issued. During the predetermined first, second, and third time intervals, the time elapsed since the transition in the respective state is measured and whether the distance between the previous sensed motion coordinates and the sensed motion coordinates has exceeded respective threshold is tested, operations indicated by the functions "f1", "f2" and "f3". The pressing or releasing of the button labeled as "evPress" and "evRelease" are events that may also trigger a transition from a state into another state.

Additionally the manner of transition from a state to another state may depend on values of some Boolean variable (flags), for example, a drag enable flag and a select enable flag. If the flags have values ON (the default values) a drag action and/or a selection via plural press-release sequences are respectively possible. If the flags have values OFF, a drag action and/or a selection via plural press-release sequences are respectively not allowed. The apparatus may receive control signals for changing the values of the flags.

Thus, a transition from the state 610 to the state 620 occurs if the drag enable flag and the select enable flag are ON and the button is pressed (i.e., evPress event occurs). In case of such transition an nPending notification is sent towards the graphical interface, and cursor motion is suppressed.

A transition from the state 620 to the state 630 occurs if according to results of the tests (i.e., evSample) the first time intervals has elapsed or a change in the sensed motion coordinates exceeds the first predetermined distance. In case of such transition an nDragStart notification is sent towards the graphical interface, and cursor motion is no longer suppressed.

A transition from the state 630 to the state 610 occurs when the button is released (i.e., an evRelease event) and a "nDragStop" notification is sent towards the graphical interface.

A transition from the state 610 to the state 630 occurs if the drag enable flag is ON and the select enable flag is OFF when the button is pressed (i.e., and evPress event). A "nDragStart" notification is sent towards the graphical interface. This allows for instantaneous detection of drag for GUI elements that can only be dragged, and can't be selected.

A transition from the state 620 to the state 640 occurs when the button is released (i.e., and evRelease event) and a "nSelect" notification is sent towards the graphical interface.

A transition from state 640 to the state 650 occurs when the button is pressed (i.e., an evPress event) and a "nSelect" notification is sent towards the graphical interface. A transition from state 650 to the state 640 occurs when the button is released (i.e., an evRelease event).

A transition from state 640 to state 610 occurs if results of the tests (i.e., evSample event) indicate that the second predetermined time interval elapsed or the sensed coordinates have changed more than the predetermined second distance.

A transition from state 650 to state 660 occurs if the results of the tests (i.e., evSample event) indicate that the third predetermined time interval elapsed or the sensed coordinates have changed more than the predetermined third distance.

A transition from state 610 to state 650 occurs when the button is pressed (i.e., an evPress event), the drag enable flag is OFF and the select enable flag is ON. A "nSelect" notification is sent towards the graphical interface.

A transition from state 660 to state 610 occurs when the button is released (i.e., an evRelease event).

A transition from state 610 to state 660 occurs if both the drag enable flag and the select enable flag are OFF and the button is pressed (i.e., an evPress event). A "nSelect" notification is sent towards the graphical interface.

In other words, the processing unit (e.g., 520) may be configured to output, as the display motion coordinates, previous sensed motion coordinates received prior to the button status indicating that the button has been pressed (1) during a first predetermined time interval after the button status indicates that the button has been pressed, but before indicating that the button has been released, and (2) while a difference between the previous sensed motion coordinates and the sensed coordinates received during the first predetermined time interval does not exceed a first predetermined distance. The processing unit may be further configured, to output, as the display motion coordinates, the previous sensed motion coordinates (1) if the status button has been released during the first time interval, (2) during a second predetermined time interval after the evolution of the button status indicates that the button was pressed and released, but before indicating that the button has been pressed again, and (3) while a difference between the previous sensed motion coordinates and the sensed motion coordinates received during the second predetermined time interval does not exceed a second predetermined distance.

The processing unit may further be configured to output, as the display motion coordinates, the previous sensed motion coordinates (1) if the button status indicates that the button has been pressed again during the second predetermined time interval after being released, (2) during a third predetermined time interval, after the evolution of the button status indicates that the button was pressed again, but has not been released again, and (3) while a difference between the previous sensed coordinates and the sensed coordinates received during the third predetermined time interval does not exceed a third predetermined distance.

In some embodiments, the processing unit may be configured to determine the display motion coordinates also depending on values of a drag enable flag and a select enable flag. The I/O interface may be configured to receive control signals for changing default values of the drag enable flag and of the select enable flag.

The default values of the drag enable flag and of the select enable flag may be "ON" values. The processing unit may be configured to output, as the display motion coordinates, previous sensed motion coordinates received prior to the button status indicating that the button has been pressed, until the button status indicates that the button has been released, if the drag enable flag has an "OFF" value. The processing unit may also be configured to output, as the display motion coordinates, the sensed motion coordinates if the select enable flag has an "OFF" value.

Figure 7:
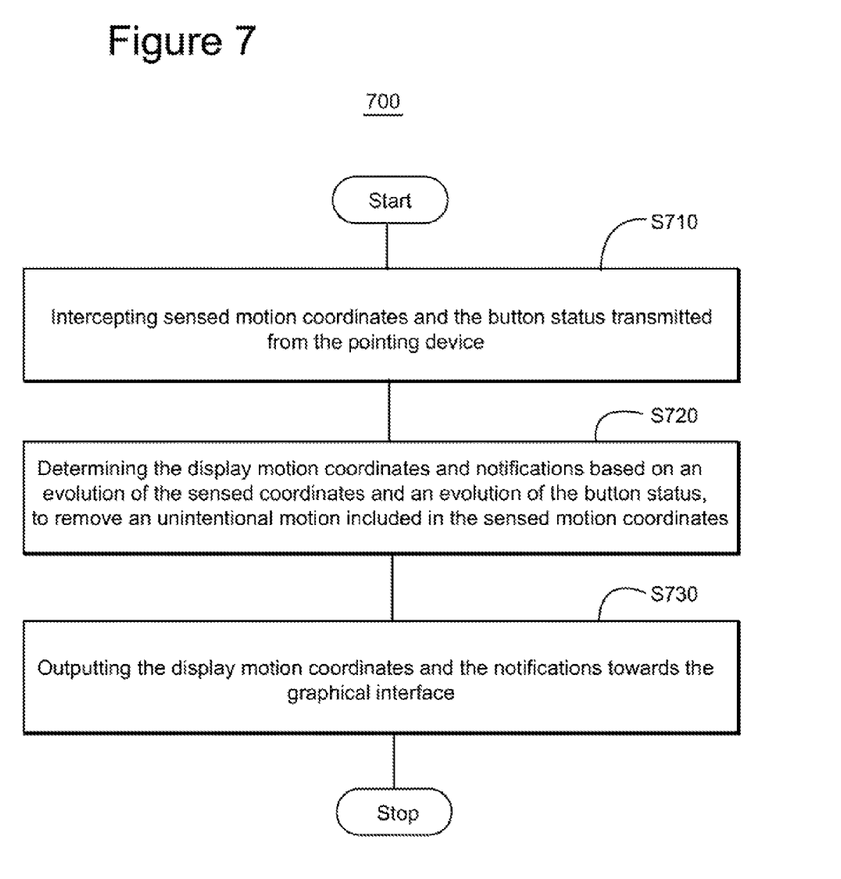
FIG. 7 is a flow diagram of a method for motion suppression according to an exemplary embodiment.

A flow diagram of a method 700 for processing information transmitted from a pointing device with a button towards a graphical interface operating according to received display motion coordinates and notifications is illustrated in FIG. 7. The method 700 includes intercepting sensed motion coordinates and the button status transmitted from the pointing device, at 710.

The method 700 further includes determining the display motion coordinates and notifications based on an evolution of the sensed coordinates and an evolution of the button status, to remove an unintentional motion included in the sensed motion coordinates, at S720. The method 700, also includes outputting the display motion coordinates and the notifications towards the graphical interface, at S730.

In one embodiment, the method determines that the display motion coordinates are previous sensed motion coordinates transmitted prior to the button status indicating that the button has been pressed (1) during a first predetermined time interval after the button status indicates that the button has been pressed, but before indicating that the button has been released, and (2) while a difference between the previous sensed motion coordinates and the sensed coordinates received during the first predetermined time interval does not exceed a first predetermined distance.

In one embodiment, the method determines that the display motion coordinates are the previous sensed motion coordinates acquired prior to the button status indicating that the button has been pressed (1) if the status button has been released during the first time interval, (2) during a second predetermined time interval after the evolution of the button status indicates that the button was pressed and released, but before indicating that the button has been pressed again, and (3) while a difference between the previous sensed motion coordinates and the sensed motion coordinates received during the second predetermined time interval does not exceed a second predetermined distance.

In one embodiment, the method determines that the display motion coordinates are the previous sensed motion coordinates (1) if the button status indicates that the button has been pressed again during the second predetermined time interval after being released, (2) during a third predetermined time interval, after the evolution of the button status indicates that the button was pressed again, but has not been released again, and (3) while a difference between the previous sensed motion coordinates and the sensed motion coordinates received during the third predetermined time interval does not exceed a third predetermined distance.

In one embodiment the method determines the notification by (1) selecting a first notification (nPending) when the received button status indicates that the button is pressed, but before determining whether a select action or a drag action follows, (2) selecting a second notification (nDragStart) when the received button status indicates that the button is pressed, and the display motion coordinates are different from the sensed motion coordinates, (3) selecting a third notification (nDragStop), when the evolution of the received button status indicates that the button has been released after a prior notification that is the second notification, and (4) selecting a fourth notification (nSelect), when the button is released and or pressed a second time after a prior notification is not the second notification.

In one embodiment the method determines the display motion coordinates also depending on values of a drag enable flag and a select enable flag that have "ON" as default values. The method of claim may further include receiving control signals to change the default values of the drag enable flag and of the select enable flag, and changing the default values of the drag enable flag and of the select enable flag according to the received control signals.

In one embodiment, if drag enable flag has an "OFF" value, the method determines the display motion coordinates to be previous sensed motion coordinates acquired prior to the button status indicating that the button has been pressed, until the button status indicates that the button has been released. If the select enable flag has an "OFF" value, the method determines the display motion coordinates to be the sensed motion coordinates.

According to one embodiment, a computer readable storing medium (such as the memory 530 in FIG. 5) stores executable codes which when executed by a computer located on a data transmission path between a pointing device with at least one button and a graphical interface operating according to received display motion coordinates and a button status make the computer execute the above described methods.

The disclosed exemplary embodiments provide a parallel computing system, a method and a computer program product for suppressing unintended motion of a pointing device having a button and linked to a graphical interface such as to be able to perform a drag action and a selection action. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

As also will be appreciated by one skilled in the art, the exemplary embodiments may be embodied in a wireless communication device, a telecommunication network, as a method or in a computer program product. Accordingly, the exemplary embodiments may take the form of an entirely hardware embodiment or an embodiment combining hardware and software aspects. Further, the exemplary embodiments may take the form of a computer program product stored on a computer-readable storage medium having computer-readable instructions embodied in the medium. Any suitable computer readable medium may be utilized including hard disks, CD-ROMs, digital versatile disc (DVD), optical storage devices, or magnetic storage devices such a floppy disk or magnetic tape. Other non-limiting examples of computer readable media include flash-type memories or other known memories.

Although the features and elements of the present exemplary embodiments are described in the embodiments in particular combinations, each feature or element can be used alone without the other features and elements of the embodiments or in various combinations with or without other features and elements disclosed herein. The methods or flow charts provided in the present application may be implemented in a computer program, software, or firmware tangibly embodied in a computer-readable storage medium for execution by a specifically programmed computer or processor.

What is claimed is:

1. An apparatus located between (A) a pointing device having a button and outputting sensed motion coordinates and a button status, and (B) a graphical interface operating according to received display motion coordinates and notifications related to the button status, the apparatus comprising:
   an input/output (I/O) interface connected to the pointing device and to the graphical interface, and configured to receive the sensed motion coordinates and the button status from the pointing device, and to output the display motion coordinates and the notifications towards the graphical interface; and
   a processing unit connected to the I/O interface and configured to determine the display motion coordinates and the notifications based on an evolution of the sensed motion coordinates and an evolution of the button status, such as to remove an unintentional motion included in the sensed motion coordinates from an evolution of the display motion coordinates, wherein
   the processing unit is further configured to output, as the display motion coordinates, previous sensed motion coordinates received prior to the button status indicating that the button has been pressed (1) during a first predetermined time interval after the button status indicates that the button has been pressed, but before indicating that the button has been released, and (2) while a difference between the previous sensed motion coordinates and the sensed coordinates received during the first predetermined time interval does not exceed a first predetermined distance,
   the processing unit is further configured, to output, as the display motion coordinates, the previous sensed motion coordinates (3) if the status button has been released, (4) during a second predetermined time interval after the evolution of the button status indicates that the button was pressed and released, but before indicating that the button has been pressed again, and (5) while a difference between the previous sensed motion coordinates and the sensed motion coordinates received during the second predetermined time interval does not exceed a second predetermined distance, and
   the processing unit is further configured to output, as the display motion coordinates, the previous sensed motion coordinates (6) if the button status indicates that the button has been pressed again during the second predetermined time interval after being pressed and released, (7) during a third predetermined time interval, after the evolution of the button status indicates that the button was pressed again, but has not been released again, and (8) while a difference between the previous sensed coordinates and the sensed coordinates received during the third predetermined time interval does not exceed a third predetermined distance.

2. The apparatus of claim 1, wherein the processing unit is further configured to determine
   (1) a first notification (nPending) when the received button status indicates that the button is pressed, but before determining whether a select action or a drag action follows,
   (2) a second notification (nDragStart) when the received button status indicates that the button is pressed, and the display motion coordinates are the sensed motion coordinates,
   (3) a third notification (nDragStop), when the evolution of the received button status indicates that the button has been released and after a prior notification that is the second notification, and
   (4) a fourth notification (nSelect), when the button is released and pressed a second time after a prior notification is not the second notification,
   wherein the drag action takes place between the second notification and the third notification and a select action takes place after the fourth notification.

3. An apparatus located between (A) a pointing device having a button and outputting sensed motion coordinates and a button status, and (B) a graphical interface operating according to received display motion coordinates and notifications related to the button status, the apparatus comprising:
   an input/output (I/O) interface connected to the pointing device and to the graphical interface, and configured to receive the sensed motion coordinates and the button status from the pointing device, and to output the display motion coordinates and the notifications towards the graphical interface; and
   a processing unit connected to the I/O interface and configured to determine the display motion coordinates and the notifications based on an evolution of the sensed motion coordinates and an evolution of the button status, such as to remove an unintentional motion included in the sensed motion coordinates from an evolution of the display motion coordinates, wherein
   (1) the processing unit is further configured to determine the display motion coordinates also depending on values of a drag enable flag and a select enable flag, and
   (2) the I/O interface is further configured to receive control signals for changing default values of the drag enable flag and of the select enable flag.

4. The apparatus of claim 3, wherein the default values of the drag enable flag and of the select enable flag have "ON" values.

5. The apparatus of claim 3, wherein the processing unit is further configured to output, as the display motion coordinates, previous sensed motion coordinates received prior to the button status indicating that the button has been pressed, until the button status indicates that the button has been released, if the drag enable flag has an "OFF" value.

6. The apparatus of claim 3, wherein the processing unit is further configured to output, as the display motion coordinates, the sensed motion coordinates if the select enable flag has an "OFF" value.

7. A method for processing information transmitted from a pointing device with at least one button towards a graphical interface operating according to received display motion coordinates and notifications, the method comprising:
   intercepting sensed motion coordinates and the button status transmitted from the pointing device;
   determining the display motion coordinates and the notifications based on an evolution of the sensed coordinates and an evolution of the button status, to remove an unintentional motion included in the sensed motion coordinates; and
   outputting the display motion coordinates and the notifications towards the graphical interface,
   wherein the determining of the display motion coordinates is performed also depending on values of a drag enable flag and a select enable flag that have "ON" as default values.

8. The method of claim 7, further comprising:
   receiving control signals to change the default values of the drag enable flag and of the select enable flag; and changing the default values of the drag enable flag and of the select enable flag.

9. The method of claim 8, if drag enable flag has an "OFF" value, the display motion coordinates are previous sensed motion coordinates acquired prior to the button status indicating that the button has been pressed, until the button status indicates that the button has been released.

10. The method of claim 8, wherein if the select enable flag has an "OFF" value, the display motion coordinates are the sensed motion coordinates.

11. A non-transitory computer readable storing medium storing executable codes which when executed by a computer located on a data transmission path between a pointing device with at least one button and a graphical interface operating according to received display motion coordinates and a button status make the computer execute a method comprising:
   intercepting sensed motion coordinates and the button status transmitted from the pointing device; and
   determining the display motion coordinates based on an evolution of the sensed coordinates, depending on an evolution of the button status, to remove an unintentional motion included in the sensed motion coordinates; and
   outputting the display motion coordinates and the button status towards the graphical interface, wherein
   the display motion coordinates are previous sensed motion coordinates transmitted prior to the button status indicating that the button has been pressed (1) during a first predetermined time interval after the button status indicates that the button has been pressed, but before indicating that the button has been released, and (2) while a difference between the previous sensed motion coordinates and the sensed coordinates received during the first predetermined time interval does not exceed a first predetermined distance,
   the display motion coordinates are the previous sensed motion coordinates acquired prior to the button status indicating that the button has been pressed (3) if the status button has been released during the first time interval, (4) during a second predetermined time interval after the evolution of the button status indicates that the button was pressed and released, but before indicating that the button has been pressed again, and (5) while a difference between the previous sensed motion coordinates and the sensed motion coordinates received during the second predetermined time interval does not exceed a second predetermined distance, and
   the display motion coordinates are the previous sensed motion coordinates (6) if the button status indicates that the button has been pressed again during the second predetermined time interval after being released, (7) during a third predetermined time interval, after the evolution of the button status indicates that the button was pressed again, but has not been released again, and (8) while a difference between the previous sensed motion coordinates and the sensed motion coordinates received during the third predetermined time interval does not exceed a third predetermined distance.

12. A method for processing information transmitted from a pointing device with at least one button towards a graphical interface operating according to received display motion coordinates and notifications, the method comprising:
   intercepting sensed motion coordinates and the button status transmitted from the pointing device;
   determining the display motion coordinates and the notifications based on an evolution of the sensed coordinates and an evolution of the button status, to remove an unintentional motion included in the sensed motion coordinates; and
   outputting the display motion coordinates and the notifications towards the graphical interface, wherein
   the display motion coordinates are previous sensed motion coordinates transmitted prior to the button status indicating that the button has been pressed (1) during a first predetermined time interval after the button status indicates that the button has been pressed, but before indicating that the button has been released, and (2) while a difference between the previous sensed motion coordinates and the sensed coordinates received during the first predetermined time interval does not exceed a first predetermined distance
   the display motion coordinates are the previous sensed motion coordinates acquired prior to the button status indicating that the button has been pressed (3) if the status button has been released during the first time interval, (4) during a second predetermined time interval after the evolution of the button status indicates that the button was pressed and released, but before indicating that the button has been pressed again, and (5) while a difference between the previous sensed motion coordinates and the sensed motion coordinates received during the second predetermined time interval does not exceed a second predetermined distance,
   the display motion coordinates are the previous sensed motion coordinates (6) if the button status indicates that the button has been pressed again during the second predetermined time interval after being released, (7) during a third predetermined time interval, after the evolution of the button status indicates that the button was pressed again, but has not been released again, and (8) while a difference between the previous sensed motion coordinates and the sensed motion coordinates received during the third predetermined time interval does not exceed a third predetermined distance.

13. The method of claim 12, wherein the determining of the notification includes:
   (1) selecting a first notification (nPending) when the received button status indicates that the button is pressed, but before determining whether a select action or a drag action follows,
   (2) selecting a second notification (nDragStart) when the received button status indicates that the button is pressed, and the display motion coordinates are different from the sensed motion coordinates,
   (3) selecting a third notification (nDragStop), when the evolution of the received button status indicates that the button has been released after a prior notification that is the second notification, and
   (4) selecting a fourth notification (nSelect), when the button is released and or pressed a second time after a prior notification is not the second notification.

14. A non-transitory computer readable storing medium storing executable codes which when executed by a computer located on a data transmission path between a pointing device with at least one button and a graphical interface operating according to received display motion coordinates and a button status make the computer execute a method comprising:
   intercepting sensed motion coordinates and the button status transmitted from the pointing device; and
   determining the display motion coordinates based on an evolution of the sensed coordinates, depending on an evolution of the button status, to remove an unintentional motion included in the sensed motion coordinates; and outputting the display motion coordinates and the button status towards the graphical interface, wherein the determining of the display motion coordinates is performed also depending on values of a drag enable flag and a select enable flag that have "ON" as default values.

* * * * *